US006684278B1

(12) United States Patent
Sakugawa et al.

(10) Patent No.: US 6,684,278 B1
(45) Date of Patent: Jan. 27, 2004

(54) MICROCOMPUTER AND MEMORY ACCESS CONTROL METHOD

(75) Inventors: Mamoru Sakugawa, Tokyo (JP); Hiroyuki Kondo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,507

(22) Filed: Dec. 8, 1999

(30) Foreign Application Priority Data

Jul. 16, 1999 (JP) ............................................ 11-203388

(51) Int. Cl.$^7$ .............................................. G06F 12/00
(52) U.S. Cl. ...................................... 710/107; 711/154
(58) Field of Search ............................... 365/233, 233.5; 710/6, 28, 29, 34, 40, 41, 45, 58, 59, 117, 240, 244, 107, 108, 110, 112, 116, 118, 123, 124, 125; 711/147, 151, 152, 154, 158, 163, 167, 169; 713/400, 401, 600, 601, 322

(56) References Cited

U.S. PATENT DOCUMENTS

| 5,347,559 | A | * | 9/1994 | Hawkins et al. ............... 377/54 |
| 5,448,717 | A | | 9/1995 | Balmer et al. |
| 5,557,783 | A | * | 9/1996 | Oktay et al. ................. 713/401 |
| 5,586,332 | A | * | 12/1996 | Jain et al. .................... 713/322 |
| 5,706,469 | A | * | 1/1998 | Kobayashi .................... 710/240 |
| 5,752,266 | A | * | 5/1998 | Miyawaki et al. ........... 711/158 |
| 5,754,815 | A | * | 5/1998 | Ernst et al. ...................... 711/5 |
| 5,754,837 | A | * | 5/1998 | Walsh et al. .................. 713/500 |
| 5,819,043 | A | * | 10/1998 | Baugher et al. ............. 709/222 |
| 5,822,255 | A | * | 10/1998 | Uchida ......................... 365/194 |
| 6,286,083 | B1 | * | 9/2001 | Chin et al. ................... 711/151 |
| 6,393,506 | B1 | * | 5/2002 | Kenny ......................... 710/113 |
| 6,434,638 | B1 | * | 8/2002 | Deshpande .................... 710/39 |
| 6,438,635 | B1 | * | 8/2002 | Date et al. ................... 710/113 |

FOREIGN PATENT DOCUMENTS

| JP | 61-213954 | 9/1986 |
| JP | 3-252740 | 12/1991 |
| JP | 4-5747 | 1/1992 |
| JP | 4-49442 | 2/1992 |
| JP | 4-120127 | 10/1992 |
| JP | 4-332040 | 11/1992 |
| JP | 7-78103 | 3/1995 |
| JP | 7-281941 | 10/1995 |
| JP | 8-161222 | 6/1996 |
| JP | 9-106370 | 4/1997 |
| JP | 9-319651 | 12/1997 |
| JP | 10-260894 | 9/1998 |

\* cited by examiner

*Primary Examiner*—Donald Sparks
*Assistant Examiner*—C. P. Chace
(74) *Attorney, Agent, or Firm*—Burns, Doane, Swecker & Mathis, LLP

(57) ABSTRACT

A microcomputer comprises a CPU, a built-in memory and a memory controller. The memory controller performs access control to the built-in memory in response to a memory access request from the CPU. The microcomputer further comprises a wait count register for storing a waiting period relating to memory access. The memory controller reads the waiting period upon receipt of the memory access request, and then, performs the access control to the built-in memory after a lapse of the waiting period. Low power consumption is achieved by utilizing the access control to the built-in memory without controlling a power source and an oscillator.

5 Claims, 7 Drawing Sheets

S8 : WAIT CANCELING STATE

S8 : WAIT CANCELING STATE

MICROCOMPUTER AND MEMORY ACCESS CONTROL METHOD

FIELD OF THE INVENTION

The present invention relates to a microcomputer incorporating a memory. More particularly, this invention relates to a microcomputer in which power consumption can be reduced by varying a memory access time according to the situation and a memory access control method by the use of a built-in micro processor (CPU).

BACKGROUND OF THE INVENTION

Explanation will be made below on a conventional microcomputer incorporating a memory therein. In recent years, with a rapid growth in, for example, portable information equipment (such as a cordless telephone or a Personal Handyphone Systems) or digital information household electrical appliances, high-speed and low power consumption microcomputers are required. However, achievement of a higher operating speed needs an increase in capacity of the built-in in memory, with an attendant problem of an increase in power consumption.

Consequently, operation of the on-board microcomputer is stopped or performed at a low speed in the aforementioned information equipment or household electrical appliances according to the situation, so as to achieve high-speed operation during normal operation and reduce power consumption.

Specifically, a digital camera requires a microcomputer of high performance since after taking a photograph the image is compressed by a data compressing system such as JPEG (Joint Photographic Experts Group). At the same time, power consumption must be reduced since such a camera is normally driven by a cell or battery.

Therefore, in the digital camera, the microcomputer is operated at a high speed immediately after a shutter is pressed, or during display of an image, or the like where high-speed operation is needed. On the contrary, for example, when the shutter is not pressed, that is, when the high-speed operation is not needed, the power source of the on-board microcomputer (or the built-in microprocessor) is turned off or the speed of an operation clock of the microcomputer (or the built-in microprocessor) is reduced, thereby reducing the power consumption.

However, in the case where the power consumption is reduced in the same manner as in the conventional microcomputer, another microcomputer (or another microprocessor) for performing management of the power source or the clock is required to be housed inside the information equipment or household electrical appliances. Namely, turning off the power source and reduction in the speed of the operation clock, so as to reduce the power consumption of the equipment as a whole must be performed under the control of this managing microcomputer.

Furthermore, the above-described managing microcomputer must not only vary the frequency of the operation clock per se but also vary the frequency multiplication ratio of the other microcomputer (other than the managing microcomputer) or divide the frequency, so as to decrease the speed of the operation, thereby reducing the power consumption.

In this way, in the case where the power consumption is reduced by the conventional method, a managing microcomputer is required to be provided in each of the equipment or appliances. This increases the number of component parts resulting into a problem that miniaturization cannot be achieved. Moreover, in the case where the speed of the clock for operating the processor is controlled, a time is taken to stabilize the oscillating frequency of an oscillator, resulting in complicated control.

Additionally, for example, in the case where a waiting operation is performed, namely, transition to the waiting state is caused by a loop according to an instruction from the CPU, a cache memory inside the microcomputer is hit, thereby inducing an increase in power consumption of the cache memory.

SUMMARY OF THE INVENTION

The present invention has been accomplished in light of the problems described above. It is an object of the present invention to provide a microcomputer capable of achieving low power consumption by utilizing access control to a built-in memory without controlling a power source and an oscillator, and a memory access control method by the built-in processor.

In order to solve the above-described problems and achieve the above-described object, a microcomputer according to a first aspect of the present invention includes a CPU, a memory and a memory controller. The memory controller performs access control to the memory in response to a memory access request from the CPU. Furthermore, the microcomputer comprises a storage unit for storing a waiting period relating to memory access. The memory controller reads this waiting period upon receipt of the memory access request, and then, performs the access control to the memory after a lapse of the waiting period.

Thus, the waiting period can be set in, for example, the counter based on the set value (the waiting period) of the storage unit before the memory access control by the memory controller. The transition from the waiting state to the access state is effected upon completion of the countdown of the counter, so that the CPU can be operated at a low speed.

Further, operation clock of the CPU may be stopped during the waiting period. Consequently, for example, when the waiting flag is active, the operating clock of the CPU is stopped, so that the clock is operated in the waiting state, and therefore, circuits such as a latch, a flip-flop and a clock driver cannot consume electric power. Thus, it is possible to produce an effect of reducing power consumption with more efficiency.

Further, the storage unit may independently store a waiting period in the case where the memory access is performed in response to the request from the CPU and a waiting period in the case where the memory access is performed in response to the request from an external device. In such a case, the memory controller can accept not only the memory access request from the CPU but also the memory access request from the external device. Buses are adjusted based on the precedence of the memory access requests when these requests are competed with each other, so that access to the memory is obtained after a lapse of one of the waiting periods selected according to the adjustment.

Thus, the microcomputer comprises the storage unit for independently storing the waiting periods according to the CPU and the external device. Further, a unit for assigning priorities to the memory access requests and selecting the waiting period according to the memory access request having the higher priority, so as to perform the processing according to the device sending the memory access request.

According to a second aspect of the present invention, a memory access control method comprises a step of storing a waiting period relating to memory access and a step of reading the waiting period upon receipt of the memory access request in the memory controller so as to perform the access control to the memory after a lapse of the waiting period.

According to the second aspect of the present invention, the waiting period set in the storing step is set in, for example, the counter before the memory access control by the memory controller. In the control step, the transition from the waiting state to the access states is effected upon completion of the count-down of the counter, so that the CPU can be operated at a low speed.

Further, operation clock of the CPU may be stopped during the waiting period. Consequently, for example, when the waiting flag is active, the operating clock of the CPU is stopped, so that the clock is operated in the waiting state, and therefore, circuits such as a latch, a flip-flop and a clock driver cannot consume electric power.

Further, a waiting period in the case where the memory access is performed in response to the request from the CPU and a waiting period in the case where the memory access is performed in response to the request from external device may be independently stored in the storing step, and not only the memory access request from the CPU but also the memory access request from the external device can be accepted in the control step, in which buses are adjusted based on the precedence of the memory access requests when these requests are competed with each other, so that access to the memory is obtained after a lapse of one of the waiting periods selected according to the adjustment.

Thus, the memory access control method comprises the steps of independently storing the waiting periods according to the CPU and the external device, and assigning priorities to the memory access requests and selecting the waiting period according to the memory access request having the higher priority, so as to perform the processing according to the device sending the memory access request.

Other objects and features of this invention will become apparent from the following description with reference to the accompanying drawings.

DESCRIPTION OF THE PREFERRED EMBODIMENTS

A microcomputer according to preferred embodiments of the present invention will be described in detail below with reference to the drawings. Here, the microcomputer is also referred to as a micro controller because it is incorporated in equipment so as to control operation of the equipment. Furthermore, it is understood that the present invention should not be restricted to the following preferred embodiments.

Figure 1:
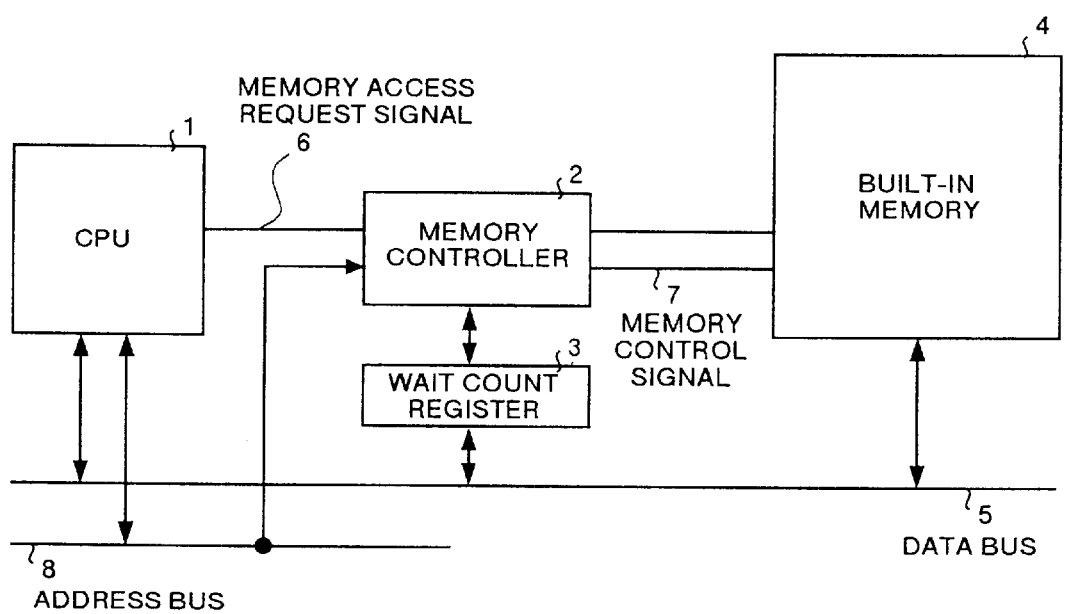
FIG. 1 is a block diagram illustrating the configuration of a microcomputer according to a first embodiment of the present invention.

FIG. 1 is a block diagram illustrating the configuration of a microcomputer according to a first embodiment of the present invention. In FIG. 1, reference numeral 1 designates a CPU for controlling, e.g., an address bus 8, a data bus 5 and a memory access request signal 6 so as to perform writing or reading processing to or from a built-in memory 4. Reference numeral 2 denotes a memory controller for outputting a memory control signal 7 upon receipt of the memory access request signal 6 from the CPU 1. Reference numeral 3 denotes a wait count register for setting a waiting time of memory access.

Figure 2:
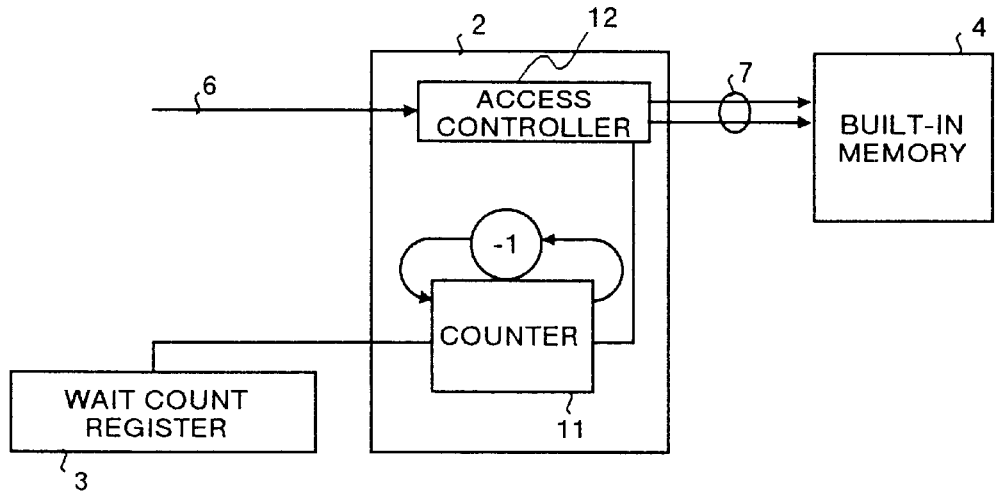
FIG. 2 is a block diagram illustrating the internal configuration of a memory controller 2.

FIG. 2 is a block diagram illustrating the internal configuration of the memory controller 2. Reference numeral 11 designates a counter for counting down data (numerical values) read from the wait count register 3. Reference numeral 12 denotes an access controller for starting memory access control at a timing when an output from the counter 11 becomes '0'.

A description will be given below of the basic operation of the microcomputer with reference to the drawings. In the case of, for example, access (writing/reading) to the built-in memory 4 in the above-described microcomputer, the CPU 1 first outputs the memory access request signal 6, and further, outputs an address signal (writing/reading) and a data signal (only writing) onto the buses 8 and 5, respectively, at a predetermined timing.

The memory controller 2 reads the value set by the wait count register 3 upon receipt of the memory access request signal 6, so that the counter 11 counts down (i.e., decrements), and then, the access controller 12 outputs the memory control signal 7 to the built-in memory 4 at the timing when the count value becomes '0'. In the present embodiment, the wait count register 3 is one of special registers, which can freely write or read in or from the CPU 1.

Figure 3:
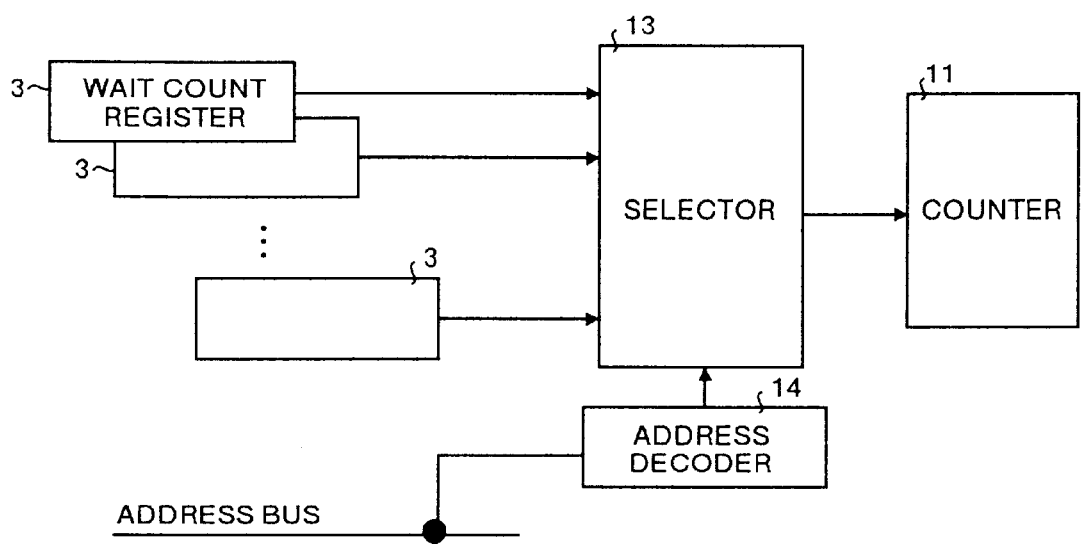
FIG. 3 is a block diagram illustrating the peripheral configuration of a memory controller other than that illustrated in FIG. 2.

The wait count register 3 may have a plurality of set values. For example, as shown in FIG. 3, a plurality of wait count registers 3, an address decoder 14 and a selector 13 may be provided, wherein the wait count registers 3 may have the set value in each of specific memory regions (e.g., addresses 0000–0fff, 1000–1fff and the like) in the built-in memory 4 to be accessed.

Upon receipt of the memory control signal 7, the built-in memory 4 outputs data stored in a designated address onto the data bus 5 at the time of, for example, reading operation. On the contrary, the built-in memory 4 writes the data on the data bus 5 in a designated address at the time of writing operation. In this way, the microcomputer illustrated in FIG. 1 performs the above-described basic operation so as to execute the access to the built-in memory 4.

Figure 4:
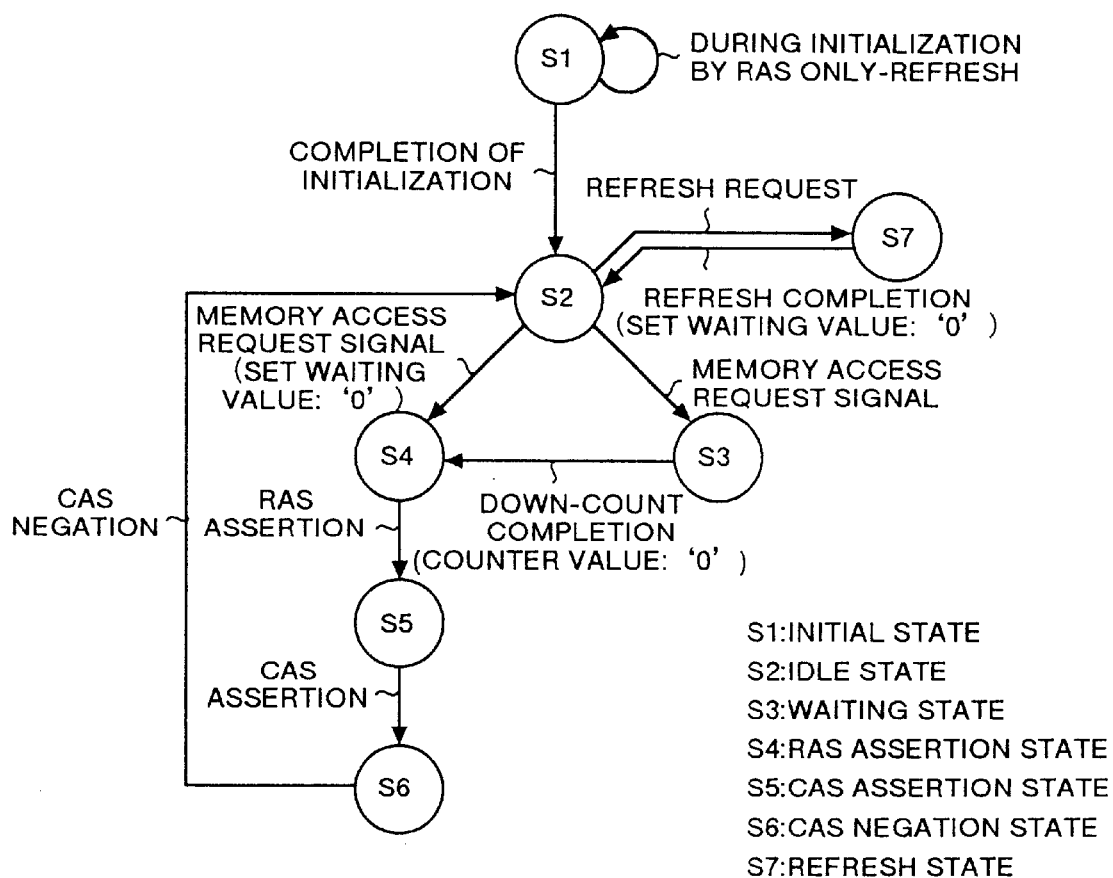
FIG. 4 is a state transition diagram illustrating memory control in the memory controller 2.
Figure 5:
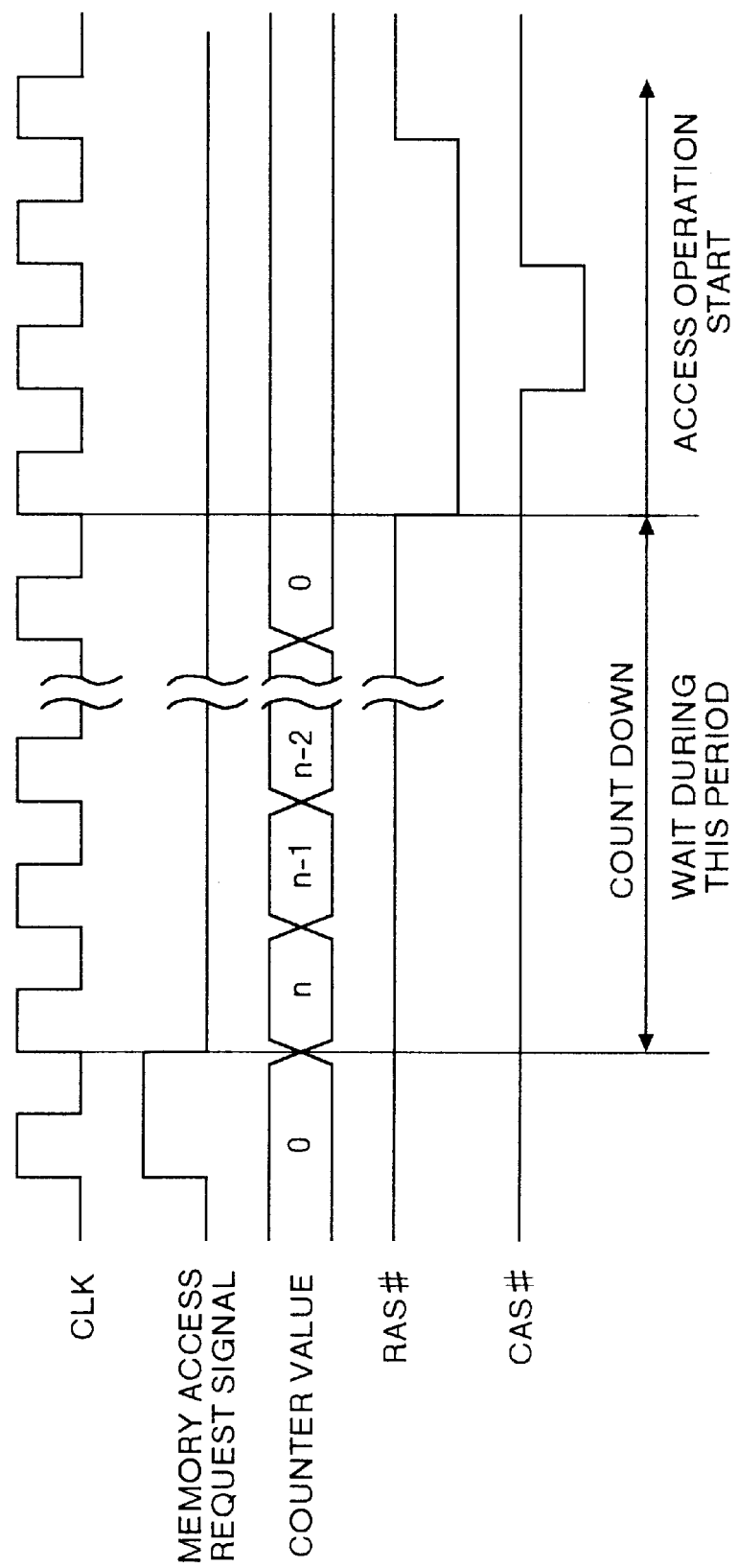
FIG. 5 is a timing chart illustrating operations of a CPU 1 and the memory controller 2.

Next, a memory access control method by the above-described microcomputer in the present embodiment will be explained with reference to the drawings. FIG. 4 is a state transition diagram (state machine) illustrating memory control in the memory controller 2. FIG. 5 is a timing chart illustrating the operations of the CPU 1 and the memory controller 2.

Here, before the access operation, i.e., before outputting of the memory control signal 7 from the memory controller 2, a waiting period is set based on the set value of the wait count register 3. Then, the transition from a waiting state to an access state is effected upon completion of the count-down by the counter 11, whereby the control signal is output. A DRAM is used as the built-in memory 4 and a DRAM controller is used as the memory controller 2 in the following explanation. However, the present invention is not limited to DRAMs, and therefore, other types of memories maybe controlled.

First of all, in the memory controller 2, transition to an initial state is caused by initializing operation such as RAS only-refresh (S1 in FIG. 4). Then, transition to a state in which it waits for the memory access request signal 6 from the CPU 1, i.e., to an idle state is caused after completion of the initialization (S2).

In this state (S2), in the case where, for example, the memory controller 2 receives the memory access request signal 6 from the CPU 1, the set value of the wait count resister 3 is '0' and there is no refresh request, transition to an RAS assertion state (S4) is caused at once in the memory controller 2. Thereafter, sequential transition to a CAS assertion state (S5) and a CAS negation state (S6) is caused at predetermined timings, so that writing or reading processing is performed, and finally, the transition returns to the idle state (S2).

Meanwhile, in the idle state (S2), in the case where the memory controller 2 receives the memory access request signal 6 from the CPU 1 (corresponding to a memory access request signal in FIG. 5), the set value of the wait count resister 3 is other than '0' (corresponding to 'n' in FIG. 5) and there is no refresh request, transition to a waiting state (S3) is caused at once in the memory controller 2. Then, transition to the RAS assertion state (S4) is caused at the time when the set value is counted down to '0'. Thereafter, the sequential transition to the CAS assertion state (S5) and the CAS negation state (S6) is caused at the predetermined timings in the memory controller 2, so that the writing or reading processing is performed, and finally, the transition returns to the idle state (S2) (see FIG. 5).

In the case of receipt of a refresh request in the idle state (S2), transition to a refresh state (S7) is caused in the memory controller 2. Then, the transition returns to the idle state (S2) after completion of refreshing operation.

As described above, in the present embodiment, before the memory controller 2 outputs the control signal, the waiting period is determined based on the set value of the wait count register 3, and further, the transition from the waiting state (S3) to the access states (S4→S5→S6) is caused upon the completion of the count-down by the counter 11. Thus, the CPU 1 is actuated at a low speed so as to reduce power consumption by utilizing the access control of the built-in memory without controlling a power source and an oscillator. Furthermore, in the present embodiment, since the period of the waiting state is set by the register 3, fine control of power consumption can be achieved by finely adjusting the number of waiting cycles.

As illustrated in the above-described refresh state (S7), since the DRAM must periodically execute the refreshing operation to maintain data, the transition to the refresh state is effected in response to the refresh request. In the present embodiment, by utilizing this feature, a waiting state for a period longer than the refresh cycle may be set, as illustrated in FIG. 6.

That is, upon receipt of the refresh request in the waiting state (S3 in FIG. 6), the memory controller 2 stops count-down, and then, transition to the refresh state (S7) is caused. The transition to the waiting state (S3) is caused again after the refreshing operation. Then, the count-down is re-started. In the transition of FIG. 6, the states other than those illustrated therein are the same as those explained already in FIG. 4, and therefore, only the different states have been illustrated in FIG. 6.

Figure 7:
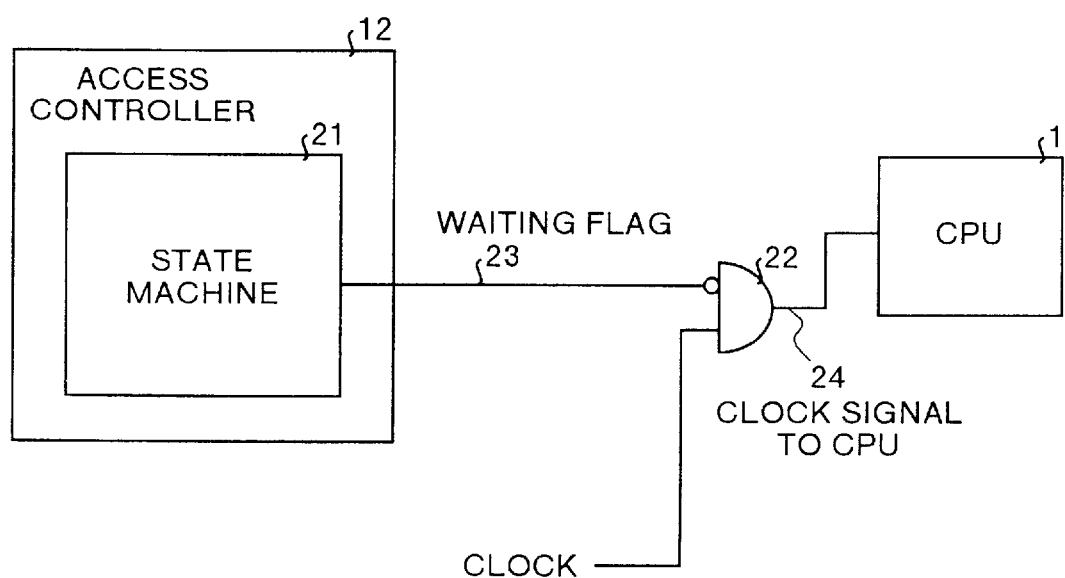
FIG. 7 is a block diagram illustrating the configuration of a microcomputer according to a second embodiment of the present invention.

FIG. 7 is a block diagram illustrating the configuration of a microcomputer according to a second embodiment of the present invention. FIG. 7 illustrates the access controller 12, illustrated already in FIG. 2, of the memory controller and its peripheral configuration. Since other constituent elements are the same as those illustrated in FIGS. 1 and 2, they are denoted by the same reference numerals, and the description thereof will be omitted.

Figure 6:
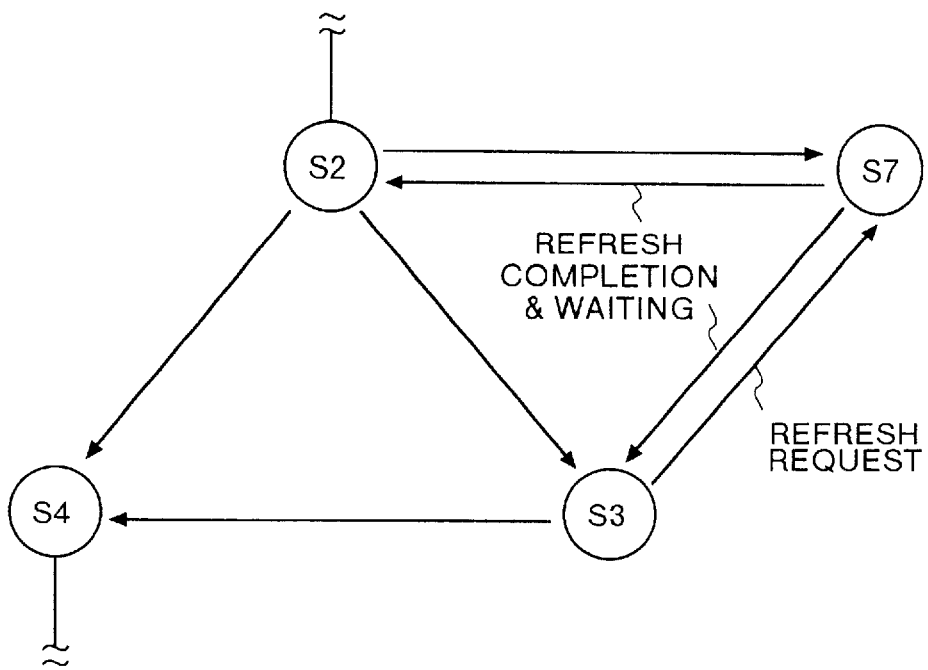
FIG. 6 is a state transition diagram illustrating another memory control in the memory controller 2.

In FIG. 7, reference numeral 21 designates a state machine representing the state transition illustrated in FIGS. 4 and 6. Reference numeral 22 denotes an AND gate for stopping a signal indicating a waiting state of the state machine 21, i.e., a clock signal 24 to a CPU 1 when a waiting flag 23 is active.

For example, in the first embodiment described above, a clock of the CPU 1 is operated even in the waiting state, so that circuits such as a latch, a flip-flop and a clock driver, which freely run, consume power, although slightly. Consequently, in the second embodiment, the clock of the CPU 1 is stopped when the waiting flag 23 is active. Thus, it is possible to further efficiently reduce power consumption.

Figure 8:
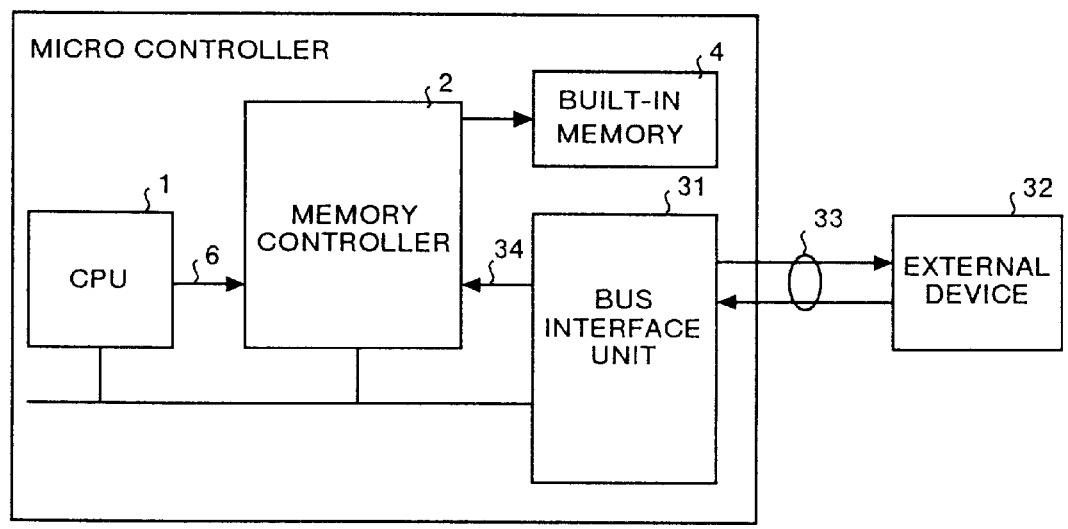
FIG. 8 is a block diagram illustrating the configuration of a microcomputer according to a third embodiment of the present invention.

FIG. 8 is a block diagram illustrating the configuration of a microcomputer according to a third embodiment of the present invention. FIG. 8 illustrates the memory controller and its peripheral configuration illustrated already in FIG. 1. Since other constituent elements are the same as those illustrated in FIGS. 1 and 2, they are denoted by the same reference numerals, and the description thereof will be omitted.

In FIG. 8, reference numeral 2 designates a memory controller accessible to a built-in memory 4 by control of an external device in addition to a memory access request signal 6 from a CPU 1. Reference numeral 31 indicates a bus interface unit for producing another memory access request signal based on a signal from the external device. Reference numeral 32 indicates the external device. Reference numeral 33 indicates signals sent from the external device 32, for example, a control signal such as a chip select signal or a read/write signal, an address signal and a data signal (only at the time of writing) Reference numeral 34 indicates a memory access request signal.

In the microcomputer (for example, M32R/D or the like) capable of memory access from the external device as described above, since the memory controller 2 receives the memory access request signals from both the CPU 1 and the external device 32, the memory controller 2 selects either one memory access request signal, i.e., adjusts to allow either one to become a bus master, and consequently, it performs the memory access in this state.

However, if transition to the waiting state is caused for the purpose of reduction of power consumption of the microcomputer, like in the first embodiment in the case where, for example, the CPU 1 performs image data processing, and then, performs both processing of writing the result in the built-in memory 4 and processing of reading the data processing result by the external device 32, a delay occurs in either one of the processing by the CPU 1 and the external device 32.

Namely, in the case where the memory controller 2 is shifted to the waiting state in response to the memory access request from the CPU 1 which is allowed to be operated at a low speed, the external device 32 which is to be operated at a high speed must wait for a period equivalent to the waiting time of the memory controller 2, for example. In the similar way, also in the case where the memory controller 2 is shifted to the waiting state in response to the memory access request from the external device 32 which is allowed to be operated at a low speed, the CPU 1 which is to be operated at a high speed must wait for a period equivalent to the waiting time of the memory controller 2, for example.

Figure 9:
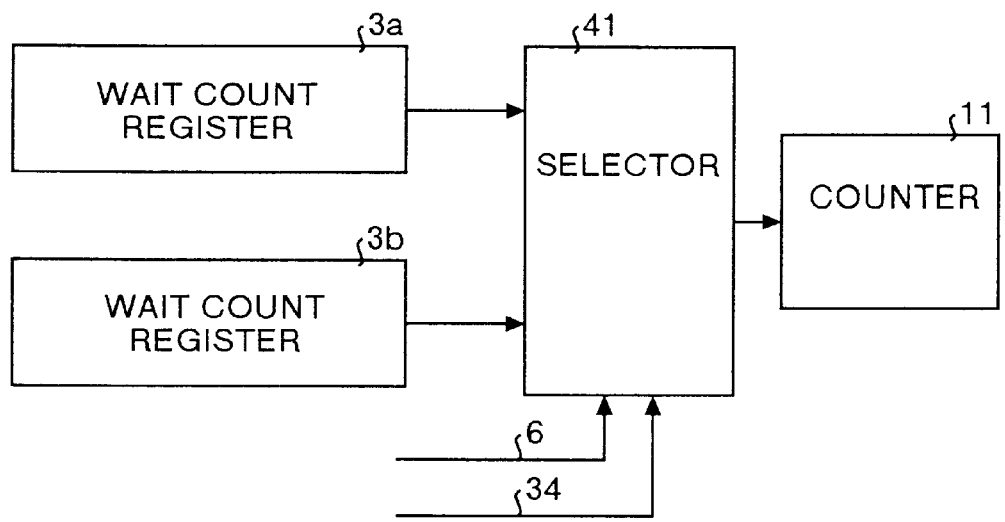
FIG. 9 is a block diagram illustrating the configuration of a memory controller 2 of FIG. 8.

Consequently, in the present embodiment, as illustrated in FIG. 9, the memory controller 2 comprises wait count registers 3a and 3b corresponding to the CPU 1 and the external device 32, respectively, and further, a selector 41 for assigning priorities to the memory access requests so as to select a set value corresponding to one memory access request having precedence over the other, thus achieving the processing according to the device sending the memory access request.

That is, in the case where, for example, the memory controller 2 alternately receives the memory access requests from the external device 32 (having a higher priority) of high-speed operation and the CPU 1 (having a lower priority) of low-speed operation, and further, even in the case where the memory controller 2 receives the memory access request 6 having a lower priority from the CPU 1 to cause the transition to the waiting state, the transition to a wait canceling state (S8 in FIG. 10) is caused upon receipt of the memory access request 34 having a higher priority from the external device 32, resulting in escape from the waiting state. In this state, the memory controller 2 accepts the memory access request from the external device 32, thereby achieving the normal memory access processing (S4→S5→S6) (see FIG. 10).

Figure 10:
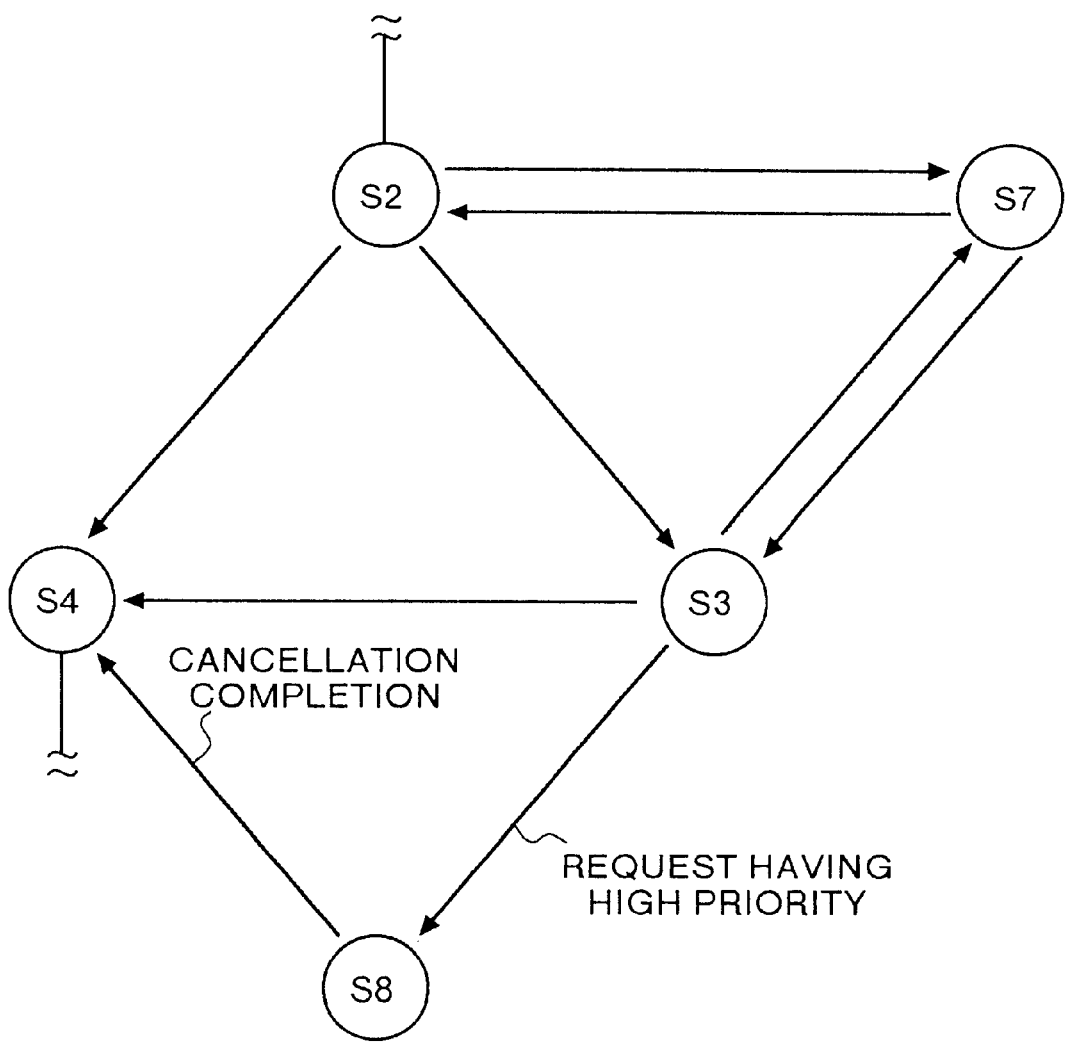
FIG. 10 is a state transition diagram illustrating memory control in the memory controller 2.

In the same manner, in the case where the memory controller 2 alternately receives the memory access requests from the CPU 1 (having a higher priority) of high-speed operation and the external device 32 (having a lower priority) of low-speed operation, and further, even in the case where the memory controller 2 receives the memory access request 34 having a lower priority from the external device 32 to cause the transition to the waiting state, the transition to the wait canceling state (S8 in FIG. 10) is caused upon receipt of the memory access request 6 having a higher priority from the CPU 1, resulting in escape from the waiting state. In this state, the memory controller 2 accepts the memory access request from the CPU 1, thereby achieving the normal memory access processing (S4→S5→S6) (see FIG. 10). In the transition of FIG. 10, the states other than those illustrated therein are the same as those explained already in FIGS. 4 and 6, and therefore, only the different states have been illustrated in FIG. 10.

As described above, the microcomputer in the third embodiment also can produce the same effects as those in the first and second embodiments described, and in addition, can prevent any deterioration of access latency caused by competition between the device (of high-speed operation) having a higher priority and the other device (of low-speed operation) having a priority lower than the former device.

In the microcomputer according to a first aspect of the present, the waiting period can be set in, for example, the counter based on the set value (the waiting period) of the storage unit before the memory access control by the memory controller. The transition from the waiting state to the access state is effected upon completion of the count-down of the counter, so that the CPU can be operated at a low speed. Consequently, it is possible to produce an effect of providing the microcomputer capable of achieving low power consumption by utilizing the access control of the built-in memory without controlling a power source or an oscillator. Moreover, with respect to the waiting control at the time of the memory access, a data driving period is extended in reading operation during the operation of the memory access. However, in the method according to the present invention, since the waiting state is caused before the memory access operation, the waiting state is allowed in an idle state without operating a sense amplifier, a data bus, an address decoder or the like incorporated inside the memory, thus producing an effect of suppression of power consumption in the memory.

Further, in the microcomputer, operation clock of the CPU may be stopped during the waiting period. Consequently, for example, when the waiting flag is active, the operating clock of the CPU is stopped, so that the clock is operated in the waiting state, and therefore, circuits such as a latch, a flip-flop and a clock driver cannot consume electric power. Thus, it is possible to produce an effect of reducing power consumption with more efficiency.

Further, the microcomputer comprises the storage unit for independently storing the waiting periods according to the CPU and the external device. Further, a unit for assigning priorities to the memory access requests and selecting the waiting period according to the memory access request having the higher priority, so as to perform the processing according to the device sending the memory access request. Therefore, it is possible to produce an effect of preventing any deterioration of access latency caused by competition between the device having a higher priority and the other device having a priority lower than the former device.

In a memory access control method according to the second aspect of the present invention, the waiting period set in the storing step is set in, for example, the counter before the memory access control by the memory controller. In the control step, the transition from the waiting state to the access states is effected upon completion of the count-down of the counter, so that the CPU can be operated at a low speed. Consequently, it is possible to produce an effect of providing the memory access control method capable of achieving low power consumption by utilizing the access control of the built-in memory without controlling a power source or an oscillator.

Further, in the memory access control method, operation clock of the CPU may be stopped during the waiting period. Consequently, for example, when the waiting flag is active, the operating clock of the CPU is stopped, so that the clock is operated in the waiting state, and therefore, circuits such as a latch, a flip-flop and a clock driver cannot consume electric power. Thus, it is possible to produce an effect of reducing power consumption with more efficiency.

Further, in the memory access control method, a waiting period in the case where the memory access is performed in response to the request from the CPU and a waiting period in the case where the memory access is performed in response to the request from external device may be independently stored in the storing step, and not only the memory access request from the CPU but also the memory access request from the external device can be accepted in the control step, in which buses are adjusted based on the precedence of the memory access requests when these requests are competed with each other, so that access to the memory is obtained after a lapse of one of the waiting periods selected according to the adjustment.

Further, the memory access control method comprises the steps of independently storing the waiting periods according to the CPU and the external device, and assigning priorities to the memory access requests and selecting the waiting period according to the memory access request having the higher priority, so as to perform the processing according to the device sending the memory access request. Therefore, it is possible to produce an effect of preventing any deterioration of access latency caused by competition between the device having a higher priority and the other device having a priority lower than the former device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microcomputer comprising:

a CPU;

a memory;

a storage unit for storing a waiting period relating to memory access; and a memory controller for reading the waiting period upon receipt of a memory access request, and for performing access control to the memory in response to the memory access request after a lapse of the waiting period, wherein the memory controller further comprises a selector for assigning a priority to the memory access requests and is capable of accepting the memory access request not only from the CPU but also from an external device, wherein the memory access requests are adjusted based on the priority of the memory access requests when these requests are competed with each other, so that access to the memory is obtained by the memory access request having a higher priority, and the selector assigns higher priority to the memory access request from one of the CPU or the external device, that has higher operational speed than the other.

2. A memory access control method in which a memory controller performs access control to a memory in response to a memory access request, said method comprising the steps of:

storing a waiting period relating to memory access;

reading the waiting period upon receipt of the memory access request;

enabling to accept the memory access request not only from a CPU but also from an external device;

assigning a priority to the memory access requests such that higher priority is assigned to the memory access request from one of the CPU or the external device, that has higher operational speed than the other;

performing the access control to the memory after a lapse of the waiting period; and adjusting the memory access requests based on the priority of the memory access requests when these requests are competed with each other, so that access to the memory is obtained by the memory access request having a higher priority.

3. The microcomputer according to claim 1, wherein when the external device has higher operational speed than that of the CPU, even when the memory controller receives the memory access request from the CPU, a transition to waiting state is caused upon receipt of the memory access request from the external device.

4. The microcomputer according to claim 1, wherein when the CPU has higher operational speed than that of the external device, even when the memory controller receives the memory access request from the external device, a transition to waiting state is caused upon receipt of the memory access request from the CPU.

5. The memory access control method according to claim 2, wherein the adjusting further includes:

causing transition to waiting state, when the memory access request having lower priority is received, upon receipt of the memory access request having higher priority.

* * * * *